(12) United States Patent
Lee et al.

(10) Patent No.: US 10,187,691 B2
(45) Date of Patent: Jan. 22, 2019

(54) METHOD AND SYSTEM FOR PROVIDING VIDEO

(71) Applicant: Electronics and Telecommunications Research Institute, Daejeon (KR)

(72) Inventors: Woojoo Lee, Daejeon (KR); Sukho Lee, Daejeon (KR); Kyung Jin Byun, Daejeon (KR); Sung Weon Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/586,742

(22) Filed: May 4, 2017

(65) Prior Publication Data

US 2017/0347150 A1    Nov. 30, 2017

(30) Foreign Application Priority Data

May 25, 2016  (KR) ........................ 10-2016-0064307

(51) Int. Cl.
*H04N 21/443* (2011.01)
*H04N 21/234* (2011.01)
(Continued)

(52) U.S. Cl.
CPC ... *H04N 21/4436* (2013.01); *H04N 21/23418* (2013.01); *H04N 21/23614* (2013.01);
(Continued)

(58) Field of Classification Search
CPC ....... H04N 21/23418; H04N 21/23614; H04N 21/44; H04N 21/4516; H04N 21/6125; H04N 21/4436
See application file for complete search history.

(56) References Cited

U.S. PATENT DOCUMENTS 6,219,839 B1 *   4/2001   Sampsell ............ H04L 12/2805
                                                      348/E5.103
7,482,997 B2    1/2009   Yang et al.
(Continued)

FOREIGN PATENT DOCUMENTS

WO    WO 2013-157895 A1    10/2013

OTHER PUBLICATIONS

Woojoo Lee, Yanzhi Wang, Donghwa Shin, Shahin Nazarian, and Massoud Pedram, "Design and Optimization of a Reconfigurable Power Delivery Network for Large-Area, DVS-Enabled OLED Displays". ETRI, Korea, Yeungnam University, Korea, University of Southern California, USA.

*Primary Examiner* — Hunter B Lonsberry
(74) *Attorney, Agent, or Firm* — Rabin & Berdo, P.C.

(57) ABSTRACT

Provided is a video providing system. The video providing system includes a memory configured to store device information of a display device, an analyzer configured to receive an original video from the outside and analyze images in the original video, and a processor configured to generate, from the original video, video streams according to a streaming mode and control signals of the display device respectively corresponding to the video streams, based on device information of a display device and analysis information from the analyzer, and provide the video streams and the control signals to the display device.

18 Claims, 9 Drawing Sheets

(51) Int. Cl.
*H04N 21/45* (2011.01)
*H04N 21/61* (2011.01)
*H04N 21/236* (2011.01)
*H04N 21/44* (2011.01)

(52) U.S. Cl.
CPC ......... *H04N 21/44* (2013.01); *H04N 21/4516* (2013.01); *H04N 21/6125* (2013.01)

(56) References Cited

U.S. PATENT DOCUMENTS

| | | |
|---|---|---|
| 8,035,315 B2 | 10/2011 | Zhao et al. |
| 8,736,180 B2 | 5/2014 | Tsai et al. |
| 9,134,825 B2 | 9/2015 | Chaji |
| 9,836,109 B2 * | 12/2017 | Lee .................... H04N 21/4318 |
| 2011/0141236 A1 | 6/2011 | Mitani et al. |
| 2012/0320281 A1 * | 12/2012 | Kinoshita ................ H04N 5/63 |
| | | 348/730 |
| 2013/0278642 A1 | 10/2013 | Dong et al. |
| 2014/0176526 A1 | 6/2014 | Oh et al. |
| 2014/0333977 A1 | 11/2014 | Hwang et al. |
| 2015/0029394 A1 | 1/2015 | Fernandes et al. |

* cited by examiner

METHOD AND SYSTEM FOR PROVIDING VIDEO

CROSS-REFERENCE TO RELATED APPLICATIONS

This U.S. non-provisional patent application claims priority under 35 U.S.C. § 119 of Korean Patent Application No. 10-2016-0064307 filed on May 25, 2016, the entire contents of which are hereby incorporated by reference.

BACKGROUND

The present disclosure herein relates to a streaming media providing method and system, and more particularly, to a video providing method and system for reducing power consumption of a display device.

An organic light emitting diode (OLED) display is one of promising next-generation display devices. OLED displays are continuously developing in the display market. An OLED display may be installed in a mobile device such as a smartphone or an electronic device such as a TV. As the size of an OLED display increases, power consumption of the OLED display may increase. Electronic devices such as TVs may be equipped with large-size displays. In this case, power consumption of OLED displays may rapidly increase. In the case where OLED displays are installed in smartphones, power consumption of the smartphones may increase due to the OLED displays.

There was an effort to reduce power consumption of devices equipped with OLED displays. Especially, an OLED dynamic voltage scaling (OLED-DVS) technology to adjust voltage level of each pixel in an OLED display has been presented to reduce power dissipation of a display panel. However, this technology requires indispensable multiple converters and additional circuitry such as controllers, etc. in a display device, which may induce implementation overhead, thereby outweigh the efficacy of the OLED-DVS technique. Furthermore, video providers such as video streaming service companies (e.g., Youtube and Netflix) have not taken into consideration any low power technique including OLED-DVS in their servicing videos.

SUMMARY

The present disclosure provides a video providing method and system for reducing power consumption of a display device.

An embodiment of the inventive concept provides a video providing system including a memory configured to store device information of a display device, an analyzer configured to receive an original video from the outside and analyze images in the original video, and a processor configured to generate, from the original video, video streams according to a streaming mode and control signals of the display device respectively corresponding to the video streams, based on device information of a display device and analysis information from the analyzer, and provide the video streams and the control signals to the display device.

In an embodiment of the inventive concept, a method for operating a video providing system having a memory in which device information of a display device is stored includes receiving a original video from the outside and analyzing images in the original video, determining a voltage for driving the images using the device information, generating, from the original video, video streams according to a streaming mode and control signals of the display device respectively corresponding to the video streams, based on analysis information and voltage determination information, and providing the video streams and the control signals to the display device.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

It should be understood that the above-described background and the following detailed description are exemplarily provided for describing the claimed invention. Reference signs are presented in embodiments of the inventive concept, and examples thereof are illustrated in the accompanying drawings. In any possible case, the same reference numerals are used in the description and the drawings to refer to the same or similar elements. The inventive concept may be implemented or applied by other embodiments. Furthermore, the detailed description may be amended or modified according to an aspect or application without departing from other objects or the scope of the inventive concept.

Figure 1:
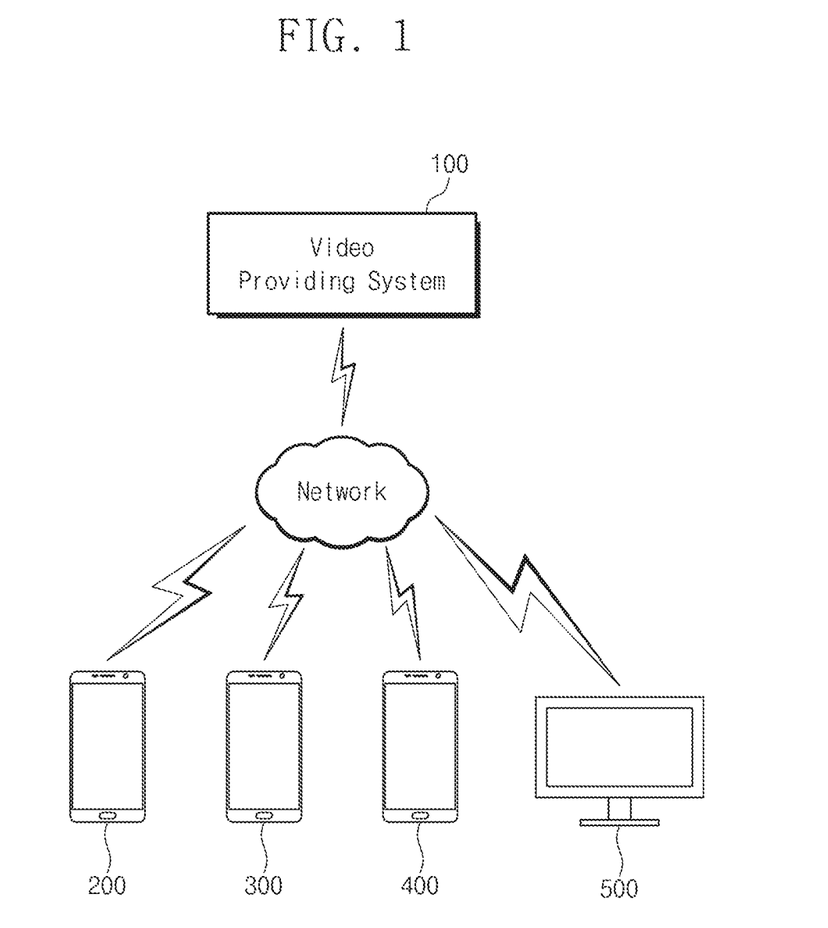
FIG. 1 is a diagram illustrating an example of application of a video providing system according to an embodiment of the inventive concept.

FIG. 1 is a diagram illustrating an example of application of a video providing system according to an embodiment of the inventive concept. Referring to FIG. 1, a video providing system 100 may provide a video to display devices 200 to 500 via a network. The display devices 200 to 500 may be a smartphone, a smart TV, a smart ring, a smart watch, a monitor, a tablet PC, or the like. The number of the display devices 200 to 500 is not limited to that illustrated in FIG. 1. The video providing system 100 according to an embodiment of the inventive concept may obtain in advance device information of the display devices 200 to 500. The video providing system 100 according to an embodiment of the inventive concept may provide a video for reducing power consumption of the display devices 200 to 500, using the device information.

Figure 2:
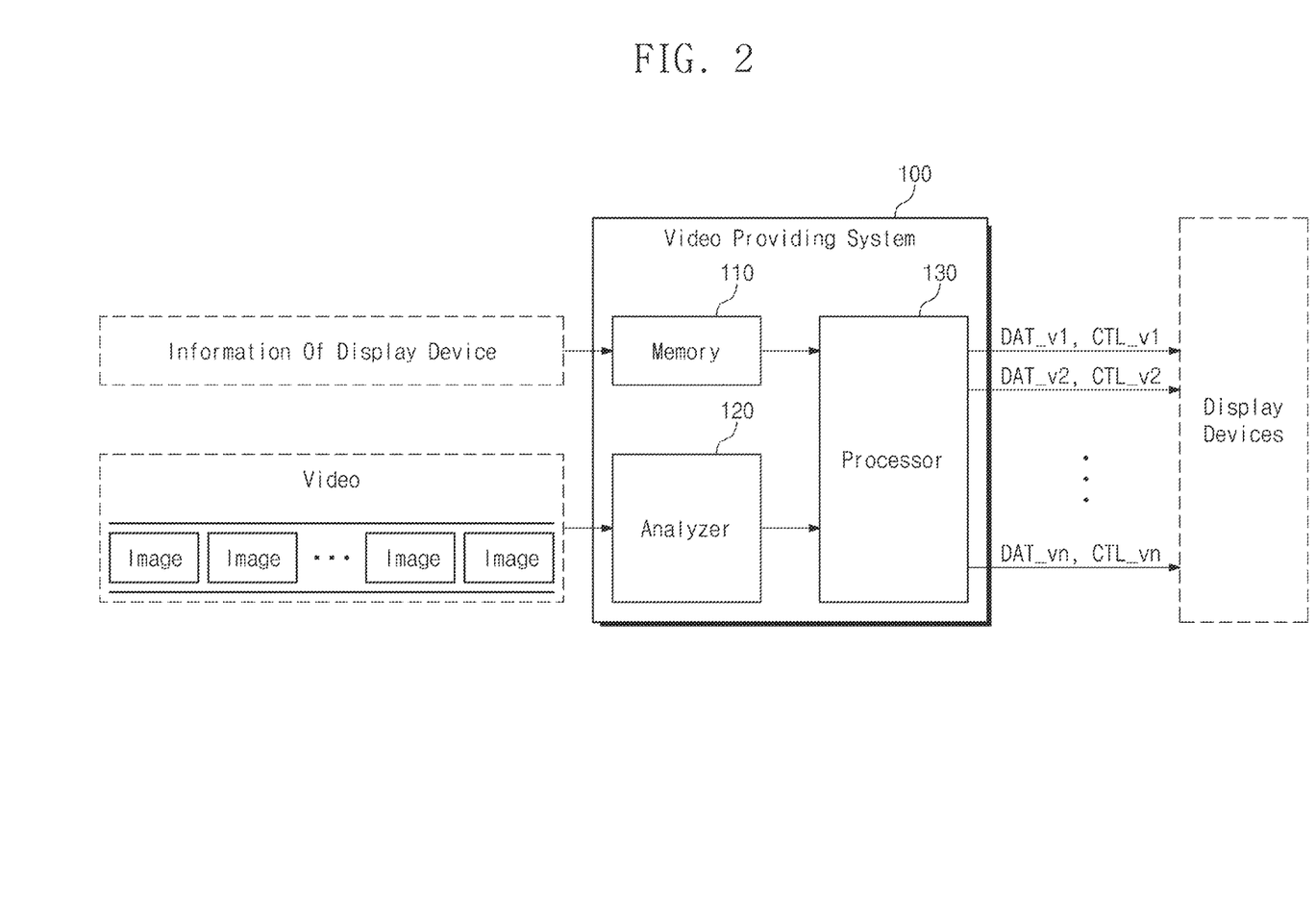
FIG. 2 is a block diagram exemplarily illustrating a video providing system according to an embodiment of the inventive concept.

FIG. 2 is a block diagram exemplarily illustrating a video providing system according to an embodiment of the inventive concept. Referring to FIG. 2, the video providing system 100 may include a memory 110, an analyzer 120, and a processor 130.

The memory 110 may store device information of a plurality of display devices. The device information of the display devices stored in the memory 110 may be transferred to the processor 130. A video provider may obtain the device information from manufacturers of display devices, and may store the device information in the memory 110. For example, the device information of the display devices may include panel information, converter information, or switch network information of the display devices. The foregoing pieces of information will be described in detail with reference to FIGS. 3 to 5.

The memory 110 may be implemented with hardware. For example, the memory 110 may be an electrically erasable programmable ROM (EEPROM), a NAND flash memory, a NOR flash memory, a phase-change random access memory (PRAM), a resistive random access memory (ReRAM), a ferroelectric random access memory (FeRAM), a spin-transfer-torque magnetic random access memory (STT-MRAM), or the like.

The analyzer 120 may analyze a original video including a plurality of images. Here, the video may include all kinds of videos such as videos shot with smartphones, sports broadcasting videos, etc. The video may be uploaded to a server (not shown) of the video provider. The analyzer 120 may analyze a pattern of a current image, differences between the current image and previous and next images, or contrast of the current image. Here, the current image represents an image which is currently analyzed by the analyzer 120 in the case where images in a video are sequentially input to the analyzer 120. When an image driving voltage becomes low, the analyzer 120 may analyze a degree of distortion in an image using the above-mentioned analysis information. The analysis information generated by the analyzer 120 may be transferred to the processor 130. The analyzer 120 may include hardware, software, or firmware.

The processor 130 may receive the device information of the display devices from the memory 110. The processor 130 may receive the analysis information of the original video from the analyzer 120. The processor 130 may generate video streams according to a streaming mode, using the analysis information. The processor 130 may generate display device control signals corresponding to the video streams respectively.

The processor 130 may generate a first video stream DAT_v1 and a first control signal CTL_v1 according to a first mode. The first mode may represent a mode in which the video providing system 100 provides an original video to a user. The first video stream DAT_v1 may represent original video data. The first control signal CTL_v1 may include driving information required to display the first video stream DAT_v1 on a display device.

The processor 130 may generate a second video stream DAT_v2 and a second control signal CTL_v2 according to a second mode. The second mode may represent a mode in which the video providing system 100 provides a video for reducing power consumption of a display device to a user. The second video stream DAT_v2 may represent video data which is not original video data but video data distorted to reduce power consumption of a display device. For example, when the processor 130 applies 1% distortion to the original video data, power consumption of a display device may be reduced by 20%. The second control signal CTL_v2 may include driving information required to display the second video stream DAT_v2 on a display device.

The processor 130 may generate a third video stream DAT_v3 and a third control signal CTL_v3 according to a third mode. The third mode may represent a mode in which the video providing system 100 provides, to a user, a video for reducing power consumption of a display device further than in the second mode. The third video stream DAT_v3 may represent video data which is not original video data but video data distorted to reduce power consumption of a display device. For example, when the processor 130 applies 10% distortion to the original video data, power consumption of a display device may be reduced by 40%. The third control signal CTL_v3 may include driving information required to display the third video stream DAT_v3 on a display device. The processor 130 may include hardware, software, or firmware. Operation of the processor 130 will be described in more detail with reference to FIG. 7.

The video providing system 100 according to an embodiment of the inventive concept may provide, to a display device, not only video data but also control signals of the display device. In order to reduce power consumption of the display device, the video providing system 100 may transfer distorted video data together with display device control signals corresponding thereto. By virtue of the video providing system 100 according to an embodiment of the inventive concept, a user of a display device may select a original video or one of videos for low power consumption through the streaming mode.

Figure 3:
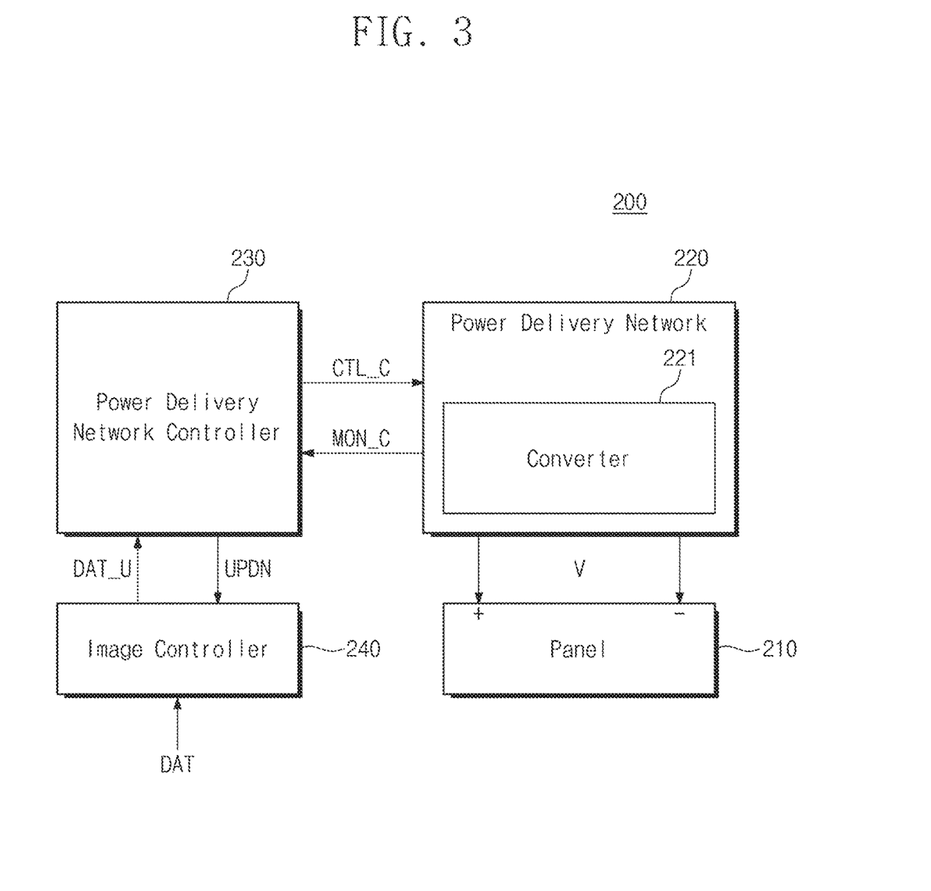
FIGS. 3 to 5 are block diagrams exemplarily illustrating a display device which receives a video from a video providing system according to an embodiment of the inventive concept.

FIG. 3 is a block diagram exemplarily illustrating a display device which receives a video from a video providing system according to an embodiment of the inventive concept. Referring to FIG. 3, the display device 200 may include a display panel 210, a power delivery network 220, a power delivery network controller 230, and an image controller 240.

The display panel 210 may be supplied with power from the power delivery network 220. For example, the display panel 210 may be an organic light emitting diode (OLED) display panel. The display panel 210 may include pixels. Brightness of the pixels may be adjusted according to an amount of provided current. Therefore, the amount of current provided to the pixels may be variable. However, voltage provided to the pixels may have a fixed value. For example, the voltage may be about 15 V. A fixed voltage value may be set for the case in which one pixel is brightest (a largest amount of current is provided).

The power delivery network 220 may include a converter 221. The power delivery network 220 may supply a voltage V to the display panel 210 in response to control by the power delivery network controller 230. Referring to FIG. 3, the power delivery network 220 may provide a converter monitoring signal MON_C to the power delivery network controller 230. Here, the converter monitoring signal MON_C may represent characteristics such as an output voltage or efficiency of the converter 221. The power delivery network 220 may receive a converter control signal CTL_C from the power delivery network controller 230. The power delivery network 220 may control the converter 221 using the converter control signal CTL_C.

The converter 221 may supply the voltage V to the display panel 210. For example, the converter 221 may be a DC-DC converter. In general, operation efficiency of a DC-DC converter may increase as an amount of driving current increases. The output voltage V from the converter may be determined by the converter control signal CTL_C.

The power delivery network controller 230 may be connected to the power delivery network 220 or the image controller 240. The power delivery network controller 230 may receive the converter monitoring signal MON_C from the power delivery network 220. The power delivery network controller 230 may receive integrated image data DAT_U from the image controller 240. The power delivery network controller 230 may generate the converter control signal CTL_C and a size adjustment signal UPDN using the converter monitoring signal MON_C and the integrated image data DAT_U.

The image controller 240 may be connected to the power delivery network controller 230. The image controller 240 may receive video data DAT from the outside of the display device 200. The image controller 240 may receive the size adjustment signal UPDN from the power delivery network controller 230. The image controller 240 may adjust a window size using the size adjustment signal UPDN. The window size may represent the number of images processed by the power delivery network controller 230. Here, the image may represent a single frame of a paused video.

The image controller 240 may integrate data of images corresponding to the window size, so as to generate the integrated image data DAT_U. The image controller 240 may transfer the integrated image data DAT_U to the power delivery network controller 230.

Referring to FIG. 3, the display device 200 may include one converter 221 for driving the display panel 210. For example, a first pixel (not shown) in the display panel 210 may require a driving voltage of 15 V, and a second pixel (not shown) may require a driving voltage lower than 15 V. Since the display device 200 is equipped with only one converter 221, the driving voltage of 15 V is supplied to both the first pixel and the second pixel, so that power may be unnecessarily consumed by the second pixel.

Figure 4:
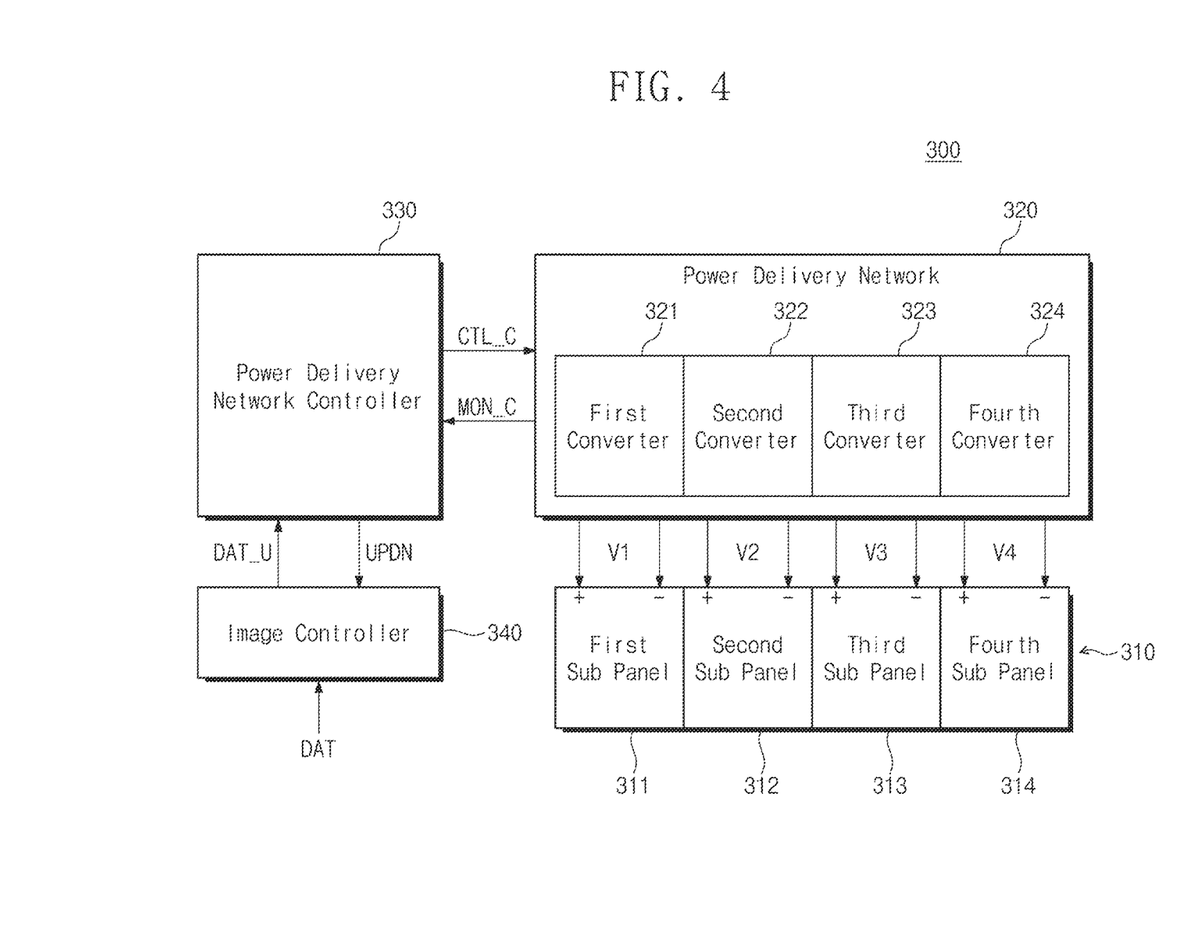

FIG. 4 is a block diagram exemplarily illustrating a display device which receives a video from a video providing system according to an embodiment of the inventive concept. Referring to FIG. 4, the display device 300 may include a display panel 310, a power delivery network 320, a power delivery network controller 330, and an image controller 340. The power delivery network controller 330 and the image controller 340 of the display device 300 perform the same operations as the power delivery network controller 230 and the image controller 240 of the display device 200 described above, and are thus not described in detail below.

The display panel 310 may include sub panels 311 to 314. The sub panels 311 to 314 may respectively receive output voltages V1 to V4 from the power delivery network 320. The number of the sub panels 311 to 314 is not limited to that illustrated in FIG. 4.

The power delivery network 320 may include converters 321 to 324. The converters 321 to 324 may respectively generate the output voltages V1 to V4. The output voltages V1 to V4 may be different from each other. For example, in the case where the first sub panel 311 requires maximum brightness of light and the other panels 312 to 314 require lower brightness of light than the maximum brightness, the output voltage V1 may be set at 15 V and the other output voltages may be set to be lower than 15 V. Since the display panel 310 may be driven using the plurality of output voltages V1 to V4, power consumption may be reduced in comparison with the case in which the display panel 310 is driven using one driving voltage.

Referring to FIG. 4, unlike the display device 200, the display device 300 may include the sub panels 311 to 314 in the display panel 310. Driving voltages respectively applied to the sub panels of the display device 300 may be different from each other. Therefore, compared to the display device 200, the display device 300 may reduce power consumption of the display panel 310. In the case where the display device 300 includes a larger number of sub panels in order to further reduce power consumption, the display device 300 requires the same number of converters as the number of sub panels. That is, although the display device 300 may include more sub panels to reduce power consumption, the degree of power consumption reduction may be decreased since the same number of converters as the number of sub panels is required.

Figure 5:
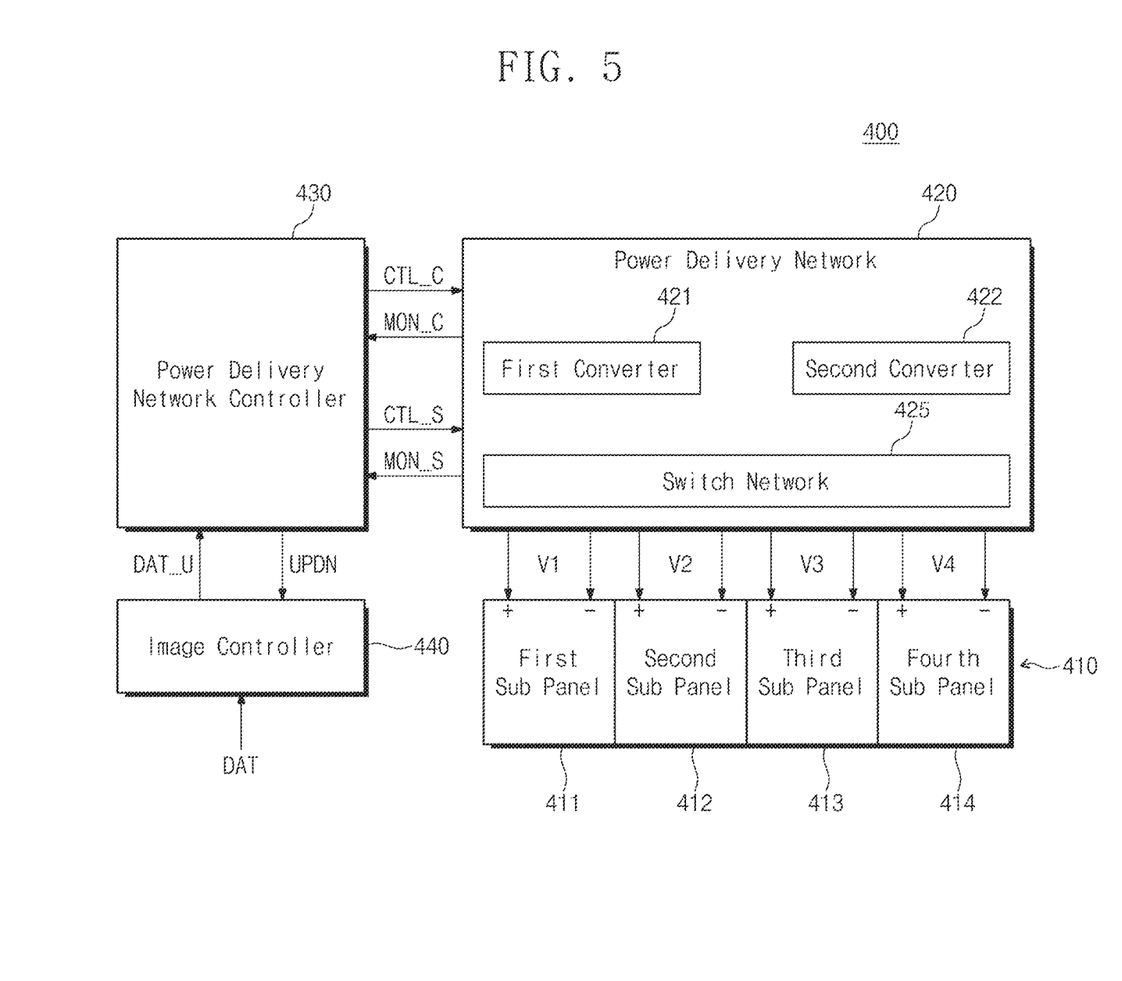

FIG. 5 is a block diagram exemplarily illustrating a display device which receives a video from a video providing system according to an embodiment of the inventive concept. Referring to FIG. 5, the display device 400 may include a display panel 410, a power delivery network 420, a power delivery network controller 430, and an image controller 440. The display panel 410 and the image controller 440 of the display device 400 perform the same operations as the display panel 310 and the image controller 340 of the display device 300 described above, and are thus not described in detail below.

The power delivery network 420 may include converters 421 and 422 and a switch network 425. The number of the converters 421 and 422 may be smaller than that of sub panels 411 to 414. Each converter may drive a portion or all of the sub panels. To this end, the power delivery network 420 may include the switch network 425. The power delivery network 420 may transfer connection information of the switch network 425 to the power delivery network controller 430 through a switch monitoring signal MON_S.

The switch network 425 may connect the converters 421 and 422 to the sub panels 411 to 414. The switch network 425 may change a connection between the converters 421 and 422 and the sub panels 411 to 414 in response to a switch network control signal CTL_S.

The power delivery network controller 430 may perform the same operation as the power delivery network controller 230 described above. In addition, the power delivery network controller 430 may generate the switch network control signal CTL_S in response to the switch monitoring signal MON_S. For the purpose of optimal power consumption of the display device 400, the power delivery network controller 430 may generate the converter control signal CTL_C and the switch network control signal CTL_S using the integrated image data DAT_U, the converter monitoring signal MON_C, and the switch monitoring signal MON_S.

Referring to FIG. 5, since the display device 400 is provided with the switch network 425 unlike the display device 300 described above, it may not be necessary to provide a converter to each sub panel. Therefore, the display device 400 may resolve the above-mentioned issue of the decrease of the degree of power consumption reduction of the display device 300, using the switch network 425.

The display devices 200 to 400 described above with reference to FIGS. 3 to 5 may include different panels, converters, or a switch network. The device information of such display devices may be stored in the memory 100 (see FIG. 2) of the video providing system. For example, the device information of the display devices may include panel information, converter information, or switch network information of the display devices. The panel information may include the number of sub panels or information of each sub panel. The information of each sub panel may include the number of pixels or contrast or resolution of an image according to an input voltage or an input current. The converter information may include efficiency of a converter according to an input/output voltage, efficiency according to a load current, a maximum load current, or a time required for changing an output voltage. The switch network information may include on/off times of switches or a delay time when performing an on/off operation.

The video providing system 100 according to an embodiment of the inventive concept may provide internal control signals to the display devices 200 to 400 described above with reference to FIGS. 3 to 5. For example, the video providing system 100 may provide the converter control signal CTL_C or the switch network control signal CTL_S. Due to the video providing system 100 according to an embodiment of the inventive concept, a display device may not include an image controller and a power delivery network controller therein. Therefore, manufactures of display devices may reduce the cost of manufacturing display devices.

Figure 6:
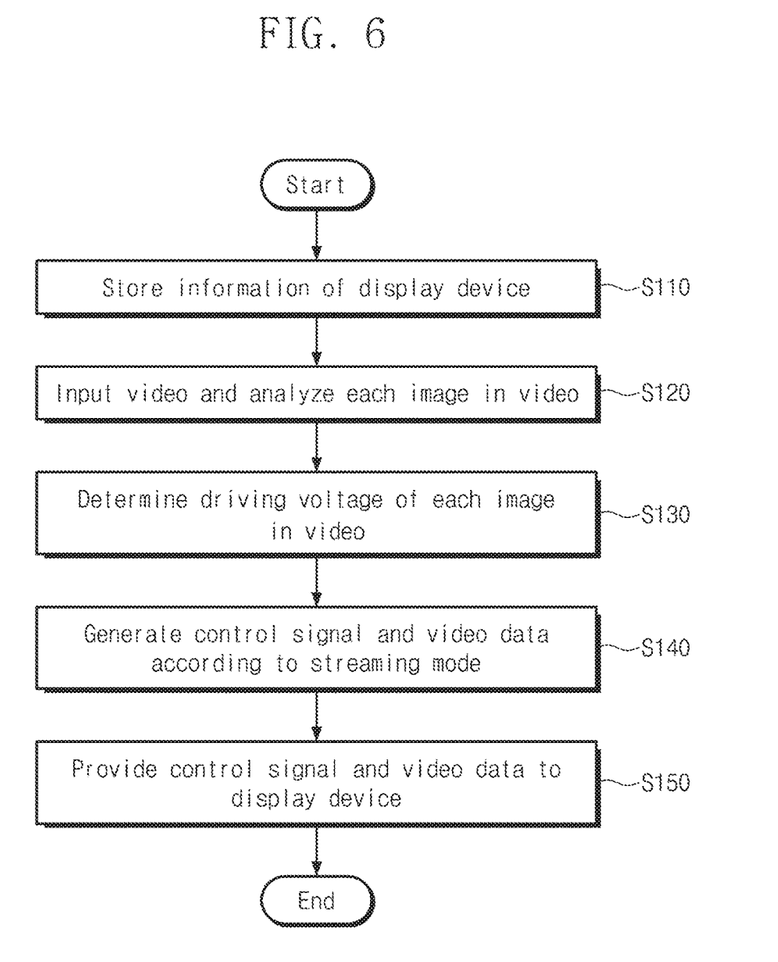
FIG. 6 is a flowchart exemplarily illustrating operation of a video providing system according to an embodiment of the inventive concept.

FIG. 6 is a flowchart exemplarily illustrating operation of a video providing system according to an embodiment of the inventive concept. FIG. 6 exemplarily illustrates a video providing operation of the video providing system 100 according to an embodiment of the inventive concept. The operation of FIG. 6 will be described also with reference to FIGS. 1 and 2.

In operation S110, device information of a plurality of display devices may be stored in the memory 110. Here, the device information of the display devices may include panel information, converter information, or switch network information. The device information of the display devices may be obtained in advance from manufactures.

In operation S120, the analyzer 120 may analyze an original video including a plurality of images. The analyzer 120 may analyze a pattern of a current image, differences between the current image and previous and next images, or contrast of the current image. The analyzer 120 may determine how much an image is distorted as an image driving voltage is decreased.

In operation S130, the processor 130 may determine a panel driving voltage for each image in a video. The processor 130 may a plurality of video data and display device control signals corresponding thereto, not one version of video data. Operation S130 will be described in more detail with reference to FIG. 7.

In operation S140, the video providing system 100 may generate video data according to a streaming mode, and display device control signals corresponding to the video data. In order to generate the above-mentioned data and control signals, the video providing system 100 may refer to analysis information of operation S120 and voltage determination information of operation S130.

In operation S150, the video providing system 100 may determine to what display device a video should be provided among a plurality of display devices. The video providing system 100 may determine a display device connected via a network. Alternatively, a user of a display device may notify the video providing system 100 of a used display device via the network. That is, a display device may be selected in response to a user's request or may be selected by the video providing system 100.

The video providing system 100 may provide, to a selected display device, the video data according to the streaming mode and the display device control signals corresponding to the video data. The user of the display device may select an original video or one of videos for low power consumption through the streaming mode. If the user selects a video of a low-power streaming mode, power consumption of the display device may be reduced.

Figure 7:
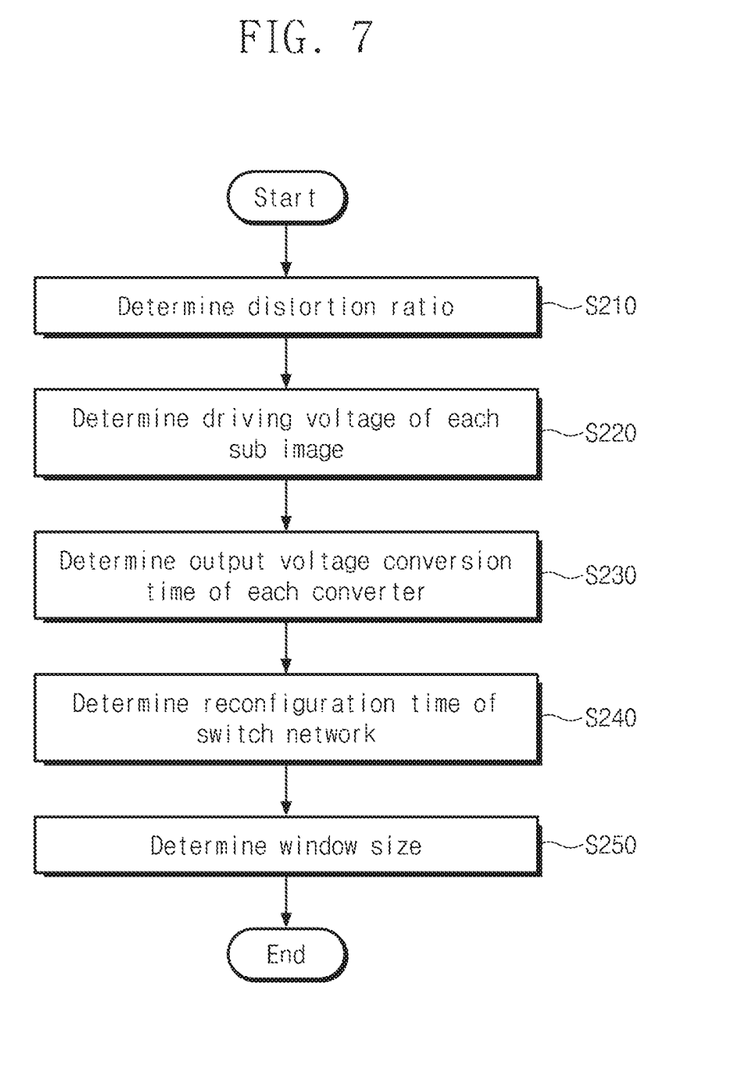
FIG. 7 is a flowchart exemplarily illustrating a part of operation of a video providing system according to an embodiment of the inventive concept.

FIG. 7 is a flowchart exemplarily illustrating a part of operation of a video providing system according to an embodiment of the inventive concept. FIG. 7 illustrates in more detail operation S130 of FIG. 6. The operation of FIG. 7 will be described also with reference to FIGS. 2 to 5.

In operation S210, a distortion ratio for an original video may be determined. The distortion ratio may depend on a power reduction ratio of a display device. Here, the power reduction ratio may be determined in advance by a video provider. For example, the video provider may determine to provide, a user, an original video or low-power videos for reducing power consumption of a display device by 20% or 40%. Accordingly, the processor 130 may determine the distortion ratios in consideration of characteristics of display devices. For example, in the case of a video stream which reduces power consumption of a display device by 20%, the distortion ratio may be 1%. For example, in the case of a video stream which reduces power consumption of a display device by 40%, the distortion ratio may be 10%.

In operation S220, the processor 130 may determine a driving voltage of each sub panel on which each sub image is displayed, in consideration of the power reduction ratio determined in advance and the distortion ratio according to the power reduction ratio. Here, the sub image may represent a divided image displayed on each sub panel of a display device.

In operation S230, the processor 130 may determine an output voltage conversion time of each converter which drives each sub image, in consideration of information of the display device. In this case, the processor 130 may also consider a driving voltage for a previous sub image and a driving voltage for a next sub image.

In operation S240, the processor 130 may determine a reconfiguration time of a switch network, based on the information of the display device. This operation may be performed in the case where the video providing system 100 provides a video to the display device 400 of FIG. 5. In the case where the video providing system 100 provides a video to the display device 200 of FIG. 3 or the display device 300 of FIG. 4, operation S240 may be skipped.

In operation S250, the processor 130 may determine a window size. Here, the window size may represent the number of images which can be processed by the processor 130 at one time. In general, a video includes a plurality of images, and the processor 130 may process images, the number of which corresponds to the window size. The processor 130 may determine the number of images to be processed at one time, in consideration of the conversion time determined in operation S230 and the reconfiguration time determined in operation S240.

Figure 8:
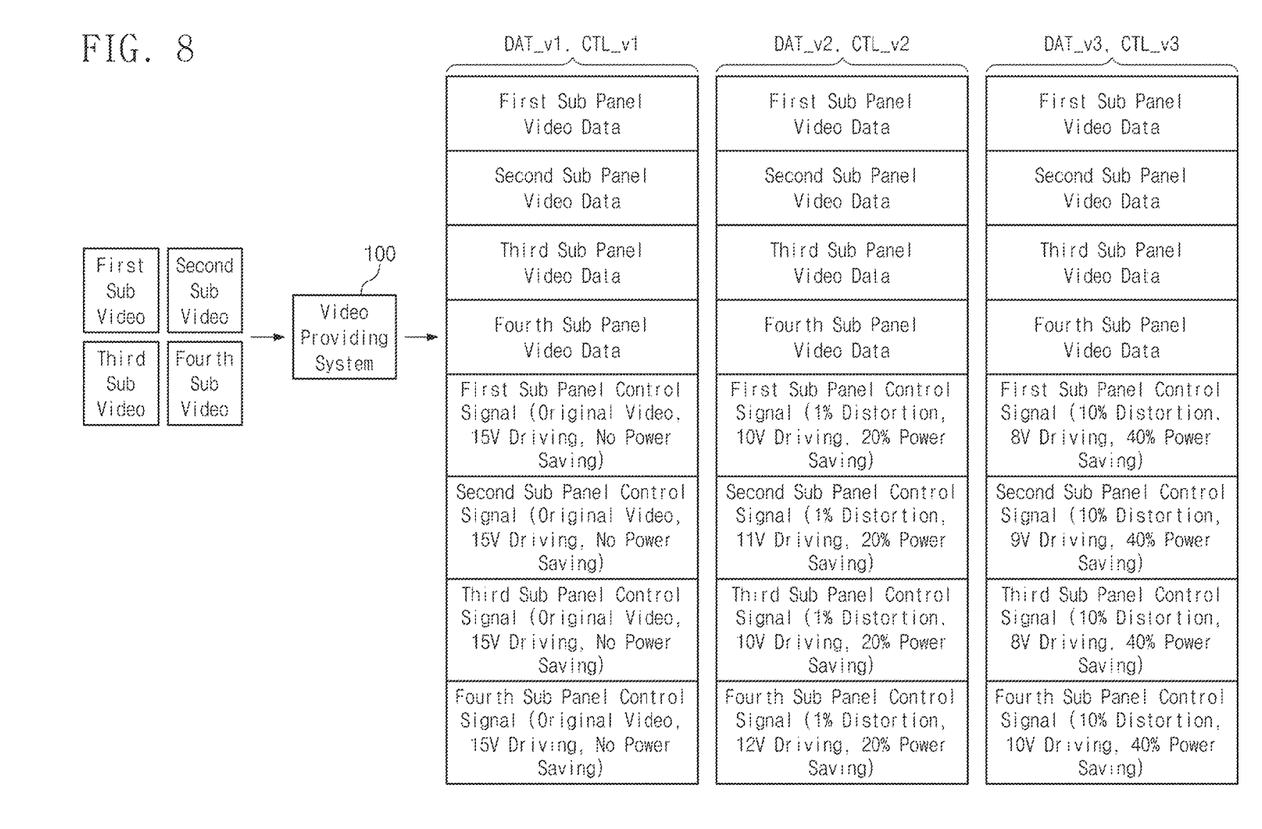
FIG. 8 is a diagram exemplarily illustrating an output of a video providing system according to an embodiment of the inventive concept.

FIG. 8 is a diagram exemplarily illustrating an output of a video providing system according to an embodiment of the inventive concept. In FIG. 8, it is assumed that the video providing system 100 provides an original video stream, a video stream which reduces power consumption of a display device by 20%, or a video stream which reduces power consumption of a display device by 40%. Referring to FIG. 8, in the case where the number of sub panels of a display device is four, an original video may be divided into four sub videos. The number of the sub videos is not limited to that illustrated in FIG. 8.

Referring to FIG. 8, the video providing system 100 may provide the first video stream DAT_v1 and the first control signal CTL_v1. Here, the first video stream DAT_v1 may represent original video data. The video providing system 100 may provide the second video stream DAT_v2 and the second control signal CTL_v2. Here, the second video stream DAT_v2 may represent video data which reduces power consumption of a display device by 20%. The video providing system 100 may provide the third video stream DAT_v3 and the third control signal CTL_v3. Here, the third video stream DAT_v3 may represent video data which reduces power consumption of a display device by 40%. Each of the first to third control signals CTL_v1 to CTL_v3 may include control signals of first to fourth sub panels.

Referring to FIG. 8, information of the control signals of the first to fourth sub panels may be assigned to a header part of each video data. Unlike the illustration of FIG. 8, the information of the control signals of the first to fourth sub panels may be dispersed. For example, a first sub panel control signal may follow first sub panel video data.

Figure 9:
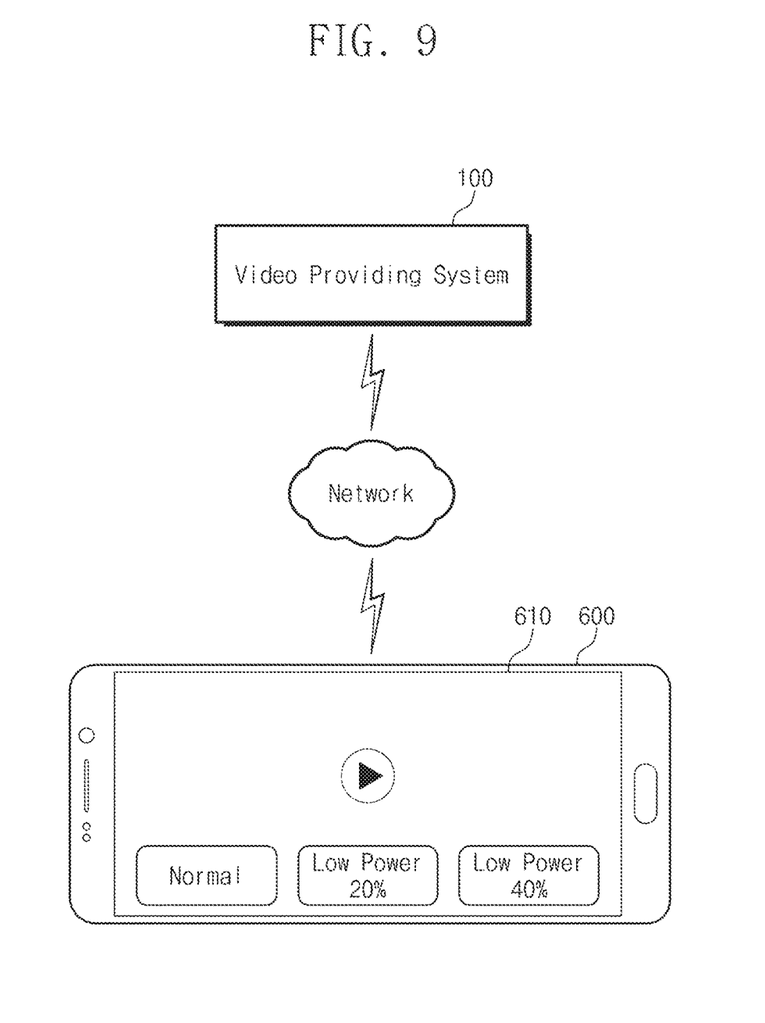
FIG. 9 is a diagram illustrating an example of application of a video providing system according to an embodiment of the inventive concept.

FIG. 9 is a diagram illustrating an example of application of a video providing system according to an embodiment of the inventive concept. FIG. 9 will be described also with reference to FIG. 8. Referring to FIG. 9, an interface of the video providing system 100 according to an embodiment of the inventive concept may be provided to a panel of a smartphone.

Referring to FIGS. 8 and 9, the video providing system 100 may provide, to a smartphone 600, an original video stream, a video stream which reduces power consumption of a display device by 20%, or a video stream which reduces power consumption of a display device by 40%. The interface of the video providing system 100 may be displayed on a panel 610 of the smartphone. The video providing system 100 according to an embodiment of the inventive concept may provide the interface so that a user of the smartphone 600 may select and play one of various videos. The interface of the video providing system 100 may be provided immediately before a video is played or while the video is played. Referring to FIG. 9, the user of the smartphone 600 may select one of a normal streaming mode, a low-power 20% streaming mode, and a low-power 40% streaming mode to view a video. Videos of low-power streaming mode are not limited to those illustrated in FIG. 9.

The video providing method and system according to an embodiment of the inventive concept may reduce power consumption of a display device.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A video providing system comprising:
a memory configured to store device information of a display device;
an analyzer configured to receive an original video from outside and analyze images in the original video; and
a processor configured to generate, from the original video, video streams according to a streaming mode and control signals of the display device respectively corresponding to the video streams, based on device information of a display device and analysis information from the analyzer, and provide the video streams and the control signals to the display device;
wherein the processor determines a distortion ratio of the images according to a power reduction ratio of the display device, and determines a voltage for driving each of the images based on the power reduction ratio, the distortion ratio, and the device information.

2. The video providing system of claim 1, wherein the device information includes panel information of panels of the display device and converter information of converters of the display device.

3. The video providing system of claim 2, wherein the device information further includes switch network information of the display device.

4. The video providing system of claim 1, wherein the analyzer analyzes a pattern of a current image, differences between the current image and previous and next images, or contrast of the current image.

5. The video providing system of claim 1, wherein the analyzer further analyzes a distortion which occurs in each of the images, when a voltage for driving each of the images becomes low.

6. The video providing system of claim 1, wherein the processor determines a conversion time at which an output voltage of converters in the display device is changed, based on the device information.

7. The video providing system of claim 6, wherein the processor determines a number of images to be processed, based on the determined conversion time.

8. The video providing system of claim 1, wherein the processor determines a conversion time at which an output voltage of converters in the display device is changed and a reconfiguration time of a switch network in the display device, based on the device information.

9. The video providing system of claim 8, wherein the processor determines a number of images to be processed, based on the determined conversion time and the determined reconfiguration time.

10. The video providing system of claim 1, wherein the streaming mode includes:
a first mode in which a first video stream for playing the original video is provided to the display device; and
a second mode in which a second video stream for playing a distorted video obtained by distorting the original video is provided to the display device according to a power reduction ratio of the display device determined in advance.

11. The video providing system of claim 10, wherein the processor additionally provides an interface for enabling a user to select one of the original video and the distorted video.

12. A method for operating a video providing system having a memory in which device information of a display device is stored, the method comprising:
receiving an original video from outside and analyzing images in the original video;
determining a voltage for driving the images using the device information;
generating, from the original video, video streams according to a streaming mode and control signals of the display device respectively corresponding to the video streams, based on analysis information and voltage determination information; and
providing the video streams and the control signals to the display device;
wherein the determining the voltage for driving the images comprises:
determining a distortion ratio of the images according to a power reduction ratio of the display device determined in advance; and
determining a voltage for driving each of the images based on the power reduction ratio, the distortion ratio, and the device information.

13. The method of claim 12, wherein the analyzing the images comprises analyzing a distortion which occurs in each of the images, when a voltage for driving each image becomes low.

14. The method of claim 12, wherein the determining the voltage for driving the images comprises:
   determining a conversion time at which an output voltage of converters in the display device is changed, based on the device information; and
   determining a number of images to be processed, based on the determined conversion time.

15. The method of claim 12, wherein the determining the voltage for driving the images comprises:
   determining a conversion time at which an output voltage of converters in the display device is changed, based on the device information;
   determining a reconfiguration time at which a switch network in the display device is reconfigured, based on the device information; and
   determining a number of images to be processed, based on the determined reconfiguration time.

16. The method of claim 12, wherein the display device is selected in response to a user's request or selected by the video providing system.

17. The method of claim 12, wherein the streaming mode includes:
   a first mode in which a first video stream for playing the original video is provided to the display device; and
   a second mode in which a second video stream for playing a distorted video obtained by distorting the original video is provided to the display device according to a power reduction ratio of the display device determined in advance.

18. The method of claim 17, wherein the providing further comprises additionally providing an interface for enabling a user to select one of the original video and the distorted video.

* * * * *